United States Patent
Zhang et al.

(10) Patent No.: US 10,952,130 B2
(45) Date of Patent: Mar. 16, 2021

(54) ACCESS CONTROL METHOD, TERMINAL DEVICE, AND RADIO ACCESS NETWORK DEVICE

(71) Applicant: Huawei Technologies Co., Ltd., Guangdong (CN)

(72) Inventors: Hongping Zhang, Shanghai (CN); Qinghai Zeng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 172 days.

(21) Appl. No.: 16/367,724

(22) Filed: Mar. 28, 2019

(65) Prior Publication Data
US 2019/0230583 A1 Jul. 25, 2019

Related U.S. Application Data

(63) Continuation of application No. PCT/CN2017/103475, filed on Sep. 26, 2017.

(30) Foreign Application Priority Data

Sep. 30, 2016 (CN) .......................... 201610872733.3

(51) Int. Cl.
*H04W 48/16* (2009.01)
*H04W 48/08* (2009.01)
(Continued)

(52) U.S. Cl.
CPC ........... *H04W 48/16* (2013.01); *H04W 48/02* (2013.01); *H04W 48/08* (2013.01); *H04W 48/20* (2013.01)

(58) Field of Classification Search
CPC ..... H04W 48/02; H04W 48/20; H04W 48/08; H04W 48/16
See application file for complete search history.

(56) References Cited

U.S. PATENT DOCUMENTS

2002/0055794 A1* 5/2002 Takae .................... H04L 12/28
700/87
2002/0157007 A1 10/2002 Sashihara
(Continued)

FOREIGN PATENT DOCUMENTS

CN 101212812 A 7/2008
CN 102045810 A 5/2011
(Continued)

OTHER PUBLICATIONS

Samsung,"Barring for NR",3GPP TSG-RAN WG2 Meeting #95 R2-165188,Gothenburg, Sweden, Aug. 22-26, 2016,total 3 pages.
(Continued)

*Primary Examiner* — Sam Bhattacharya
(74) *Attorney, Agent, or Firm* — Womble Bond Dickinson (US) LLP

(57) ABSTRACT

Embodiments of this application provide an access control method, a terminal device, and a radio access network device. The method includes: receiving, by a terminal device, access control information sent by a radio access network device; when the terminal device needs to initiate access or a service, checking, by the terminal device, a first check item obtained in a predetermined order from a plurality of check items in the access control information; obtaining, by the terminal device when the terminal device belongs to a target object indicated by first target object information included in the first check item, a first check result based on the first check item; and when the first check item is not a last check item of the plurality of check items, determining, by the terminal device, the first check result as a final result based on the first check result and first result processing information of the first check item, or checking a second check item obtained in the predetermined order from the plurality of check items. According to the embodi-
(Continued)

ments of this application, flexible access may be implemented.

20 Claims, 6 Drawing Sheets

(51) Int. Cl.
*H04W 48/02* (2009.01)
*H04W 48/20* (2009.01)

(56) References Cited

U.S. PATENT DOCUMENTS

| | | |
|---|---|---|
| 2015/0257088 A1 | 9/2015 | Hsu et al. |
| 2015/0295754 A1 | 10/2015 | Godfrey et al. |
| 2016/0219493 A1 | 7/2016 | Kim et al. |
| 2017/0041854 A1 | 2/2017 | Kim et al. |

FOREIGN PATENT DOCUMENTS

| | | |
|---|---|---|
| CN | 102271382 A | 12/2011 |
| CN | 102404821 A | 4/2012 |
| CN | 102469547 A | 5/2012 |
| CN | 104737590 A | 6/2015 |
| CN | 104904137 A | 9/2015 |
| CN | 105612788 A | 5/2016 |
| CN | 105722187 A | 6/2016 |
| KR | 10-2011-0003228 A | 1/2011 |
| WO | 2015002268 A1 | 1/2015 |
| WO | 2015/104118 A1 | 7/2015 |
| WO | 2016/076606 A1 | 5/2016 |

OTHER PUBLICATIONS

Ericsson,"Access control for NR",3GPP TSG-RAN WG2 #94 Tdoc R2-165589,Gothenburg, Sweden, May 22-26, 2016,total 4 pages.
3GPP TS 22.011 V13.6.0 (Jun. 2016), 3rd Generation Partnership Project;Technical Specification Group Services and System Aspects-;Service accessibility(Release 13), Jun. 2016. total 28 pages. XP051295204.
CATT, The ACB parameters for Delay Tolerant Access. 3GPP TSG RAN WG2 Meeting #77, Dresden, Germany, Feb. 6-10, 2011, R2-120738, 3 pages.

* cited by examiner

ACCESS CONTROL METHOD, TERMINAL DEVICE, AND RADIO ACCESS NETWORK DEVICE

CROSS-REFERENCE TO RELATED APPLICATIONS

This application is a continuation of International Application No. PCT/CN2017/103475, filed on Sep. 26, 2017, which claims priority to Chinese Patent Application No. 201610872733.3, filed on Sep. 30, 2016. The disclosures of the aforementioned applications are hereby incorporated by reference in their entireties.

TECHNICAL FIELD

This application relates to the field of wireless communications, and more specifically, to an access control method, a terminal device, and a radio access network device.

BACKGROUND

A mobile operator intends that when a special situation occurs in an area, access requests or paging response requests sent by all or some terminal devices in the area can be prohibited. For example, when a large quantity of terminal devices in the area request to access a network, network congestion occurs, or an emergency state occurs in the area.

An access class barring (ACB) mechanism is introduced into Release 8 of a Long Term Evolution (LTE) system, and a plurality of different access control mechanisms are introduced into subsequent releases, to implement access control on a terminal device.

SUMMARY

Embodiments of this application provide an access control method, a terminal device, and a radio access network device, to perform more flexible access control and service control on the terminal device.

According to a first aspect, an embodiment of this application provides an access control method, including: receiving, by a terminal device, access control information sent by a radio access network device, where the access control information includes a plurality of check items arranged in a predetermined order, each of the plurality of check items includes target object information and result processing information, and the result processing information is used to indicate that successful check is used as a final result or unsuccessful check is used as a final result; when the terminal device needs to initiate access or a service, checking, by the terminal device, a first check item obtained in the predetermined order from the plurality of check items; obtaining, by the terminal device when the terminal device belongs to a target object indicated by first target object information included in the first check item, a first check result based on the first check item, where the first check result is successful check or unsuccessful check; and when the first check item is not a last check item of the plurality of check items, determining, by the terminal device, the first check result as the final result based on the first check result and first result processing information of the first check item, or checking a second check item obtained in the predetermined order from the plurality of check items.

Optionally, the first check item is used to indicate an action that the terminal device needs to perform, and the terminal device performs the action that needs to be performed, and obtains the first check result.

Therefore, in this embodiment of this application, the terminal device receives the access control information sent by the radio access network device to the terminal device, and performs access control based on the access control information, where each of the plurality of check items includes a piece of result processing information. Therefore, when sequentially checking the plurality of check items, the terminal device can directly use successful check as a final result in a particular situation, and initiate access or a service to the radio access network device, and does not need to determine a next check item. Therefore, a control process is more flexible, and check time is reduced, to implement a more powerful access control function.

In an optional implementation, the determining, by the terminal device, the first check result as the final result based on the first check result and first result processing information of the first check item, or checking a second check item obtained in the predetermined order from the plurality of check items includes: when the first result processing information is used to indicate that successful check is used as the final result, and the first check result is successful check, determining, by the terminal device, the first check result as the final result; and the method further includes: initiating, by the terminal device, access or a service to the radio access network device.

In this case, some terminal devices having high priorities or terminal devices initiating high-priority services can directly initiate access or services to the radio access network device, and do not need to check a next check item.

In an optional implementation, the determining, by the terminal device, the first check result as the final result based on the first check result and first result processing information of the first check item, or checking a second check item obtained in the predetermined order from the plurality of check items includes: when the first result processing information is used to indicate that unsuccessful check is used as the final result, and the first check result is unsuccessful check, determining, by the terminal device, the first check result as the final result; and the method further includes: prohibiting the terminal device from initiating access or a service to the radio access network device.

In an optional implementation, the check item includes prohibition duration; and the prohibiting the terminal device from initiating access or a service to the radio access network device includes: starting, by the terminal device, a timer, where duration of the timer is first prohibition duration included in the first check item; and before the timer times out, prohibiting the terminal device from initiating access or a service.

In this case, the terminal device is prohibited from initiating access or a service to the radio access network device in the prohibition duration. This can alleviate network congestion to a particular extent.

In an optional implementation, the determining, by the terminal device, the first check result as the final result based on the first check result and first result processing information of the first check item, or checking a second check item obtained in the predetermined order from the plurality of check items includes: when the first result processing information is used to indicate that successful check is used as the final result, and the first check result is unsuccessful check, checking, by the terminal device, the second check item; or when the first result processing information is used to indicate that unsuccessful check is used as the final result, and the first check result is successful check, checking, by the terminal device, the second check item.

In an optional implementation, the method further includes: when the terminal device is not the target object indicated by the first target object information, checking, by the terminal device, the second check item.

In an optional implementation, when the first check item is the last check item of the plurality of check items, the method further includes: when the terminal device is not the target object indicated by the first target object information, initiating, by the terminal device, access or a service to the radio access network device; when the first check result is successful check, initiating, by the terminal device, access or a service to the radio access network device; or when the first check result is unsuccessful check, prohibiting the terminal device from initiating access or a service to the radio access network device.

In an optional implementation, when the first check item is the last check item of the plurality of check items, the terminal device belongs to a target object indicated by first target information included in the first check item, and the first check result is unsuccessful check, the first result processing information in the first check item may be ignored, unsuccessful check is directly used as the final result, and the terminal device is prohibited from initiating access or a service to the radio access network device.

In an optional implementation, when the first check item is the last check item of the plurality of check items, and the terminal device is not the target object indicated by the first target object information, the terminal device may determine the final result based on a check result of a previous check item of the first check item.

Optionally, when the check result of the previous check item is successful check, the terminal device may use successful check as the final result. In this case, the terminal device initiates access or a service to the radio access network device.

Optionally, when the check result of the previous check item is successful check, the terminal device may use successful check as the final result. In this case, the terminal device initiates access or a service to the radio access network device.

Optionally, when the terminal device does not belong to target objects indicated by target object information included in all check items before the first check item as the last check item, the terminal device may use successful check as the final result. In this case, the terminal device may initiate access or a service to the radio access network device.

Optionally, when the terminal device does not belong to target objects indicated by target object information included in all check items before the first check item as the last check item, the terminal device may further use unsuccessful check as the final result. In this case, the terminal device is prohibited from initiating access or a service to the radio access network device.

In an optional implementation, the check item includes probability information; and the obtaining, by the terminal device, a first check result based on the first check item includes: determining, by the terminal device, the first check result based on first probability information included in the first check item and a random number randomly generated in a first value range.

Optionally, the first check item is used to indicate an action of generating, by the terminal device, the random number in the first value range, and an action of determining the first check result based on the random number and the first probability information included in the first check item.

In this case, based on the actions indicated by the first check item, the terminal device first generates the random number in the first value range and then determines the first check result based on the first probability information and the randomly generated random number.

Optionally, the probability information is used to indicate a probability that the terminal device can perform successful check on the check item or is used to indicate a probability that the terminal device cannot perform successful check on the check item.

In an optional implementation, the target object information includes a target attribute and/or an applicable status; and the obtaining, by the terminal device when the terminal device belongs to a target object indicated by first target object information included in the first check item, a first check result based on the first check item includes: when an attribute of the terminal device matches a first target attribute included in the first check item, obtaining, by the terminal device, the first check result based on the first check item; and/or when a current status of the terminal device matches a first applicable status included in the first check item, obtaining, by the terminal device, the first check result based on the first check item.

In an optional implementation, the target attribute belongs to at least one of an access class of the terminal device, a type of a service initiated by the terminal device, a type of the terminal device, and application identifier information.

In an optional implementation, the applicable status includes a connected state and/or an idle state.

In an optional implementation, the receiving, by a terminal device, access control information sent by a radio access network device includes: receiving, by the terminal device, the access control information sent by the radio access network device by using a broadcast message; or receiving, by the terminal device, the access control information sent by the radio access network device by using dedicated signaling.

In an optional implementation, the receiving, by the terminal device, the access control information sent by the radio access network device by using dedicated signaling includes: updating, by the terminal device, the access control information received previously by using the broadcast message to the access control information received by using the dedicated signaling.

Optionally, when continuously receiving access control information twice by using dedicated signaling, the terminal device may update, by using newly received access control information, access control information received last time.

Optionally, when continuously receiving access control information twice by using a broadcast message, the terminal device may update, by using newly received access control information, access control information received last time.

In an optional implementation, the dedicated signaling is dedicated Radio Resource Control RRC signaling.

According to a second aspect, an embodiment of this application provides an access control method, including: sending, by a radio access network device, access control information to a terminal device, where the access control information includes a plurality of check items arranged in a predetermined order, and each of the plurality of check items includes target object information and result processing information, where the plurality of check items are used by the terminal device to check the plurality of check items in the predetermined order when the terminal device needs to initiate access or a service, the target object information is used by the terminal device to check whether the terminal device belongs to a target object indicated by the target object information, and the result processing information is used to indicate that successful check is used as a final result or unsuccessful check is used as a final result; and if the terminal device belongs to a target object indicated by target object information included in a current check item, a check result of the current check item and result processing information of the current check item are used by the terminal to determine the check result of the current check item as the final result or check a next check item obtained in the predetermined order from the plurality of check items.

Therefore, in this embodiment of this application, the radio access network device sends the access control information to the terminal device, so that the terminal device performs access control based on the access control information, where each of the plurality of check items includes a piece of result processing information. Therefore, when sequentially checking the plurality of check items, the terminal device can directly use successful check as a final result in a particular situation, and initiate access or a service to the radio access network device, and does not need to determine a next check item. Therefore, a control process is more flexible, and check time is reduced, to implement a more powerful access control function.

Additionally, an operator can configure the order and content of the plurality of check items based on a requirement of the operator, thereby flexibly performing access control on the terminal device; and the plurality of check items have a same structure, and when a new check item or a target attribute needs to be added, setting may be performed based on the same structure, thereby having a relatively good extensibility.

In an optional implementation, the sending, by a radio access network device, access control information to a terminal device includes: sending, by the radio access network device, the access control information to the terminal device by using a broadcast message; or sending, by the radio access network device, the access control information to the terminal device by using dedicated signaling.

In an optional implementation, the dedicated signaling is dedicated Radio Resource Control RRC signaling.

In an optional implementation, the check item includes prohibition duration, and if the terminal determines the check result of the current check item as the final result and the final result is unsuccessful check, prohibition duration of the current check item is used to indicate duration in which the terminal device is prohibited from initiating access or a service to the radio access network device.

Optionally, the check items may have different or same prohibition duration.

In an optional implementation, the check item includes probability information, and the probability information is used by the terminal device to determine a check result.

Optionally, the probability information is used to indicate a probability that the terminal device can perform successful check on the check item or is used to indicate a probability that the terminal device cannot perform successful check on the check item.

In an optional implementation, the target object information includes a target attribute and/or applicable status, and if an attribute of the terminal device matches the target attribute and/or a current status of the terminal device matches the applicable status, the terminal device belongs to the target object indicated by the target object information.

In an optional implementation, the target attribute belongs to at least one of an access class of the terminal device, a type of a service initiated by the terminal device, a type of the terminal device, and application identifier information.

In an optional implementation, the applicable status includes a connected state and/or an idle state.

According to a third aspect, an embodiment of this application provides a terminal device, configured to perform the method according to any one of the first aspect or possible implementations of the first aspect. Specifically, the terminal device includes a module unit configured to perform the method according to any one of the first aspect or possible implementations of the first aspect.

According to a fourth aspect, an embodiment of this application provides a radio access network device, configured to perform the method according to any one of the second aspect or possible implementations of the second aspect. Specifically, the radio access network device includes a module unit configured to perform the method according to any one of the second aspect or possible implementations of the second aspect.

According to a fifth aspect, an embodiment of this application provides a terminal device, configured to perform the method according to any one of the first aspect or possible implementations of the first aspect. The terminal device includes a processor, a memory, a receiver, and a transmitter, where the processor, the memory, the receiver, and the transmitter are coupled by using a bus system, where the memory is configured to store an instruction, the receiver and the transmitter are used by the terminal device to exchange information with a radio access network device, and the processor is configured to execute the instruction stored in the memory.

The receiver is configured to receive access control information sent by the radio access network device, where the access control information includes a plurality of check items arranged in a predetermined order, each of the plurality of check items includes target object information and result processing information, and the result processing information is used to indicate that successful check is used as a final result or unsuccessful check is used as a final result;

the processor is configured to: when the terminal device needs to initiate access or a service, check a first check item obtained in the predetermined order from the plurality of check items;

the processor is configured to obtain, when the terminal device belongs to a target object indicated by first target object information included in the first check item, a first check result based on the first check item, where the first check result is successful check or unsuccessful check; and the processor is configured to: when the first check item is not a last check item of the plurality of check items, determine the first check result as the final result based on the first check result and first result processing information of the first check item, or check a second check item obtained in the predetermined order from the plurality of check items.

According to a sixth aspect, an embodiment of this application provides a radio access network device, configured to perform the method according to any one of the second aspect or possible implementations of the second aspect. The terminal device includes a processor, a memory, a receiver, and a transmitter, where the processor, the memory, the receiver, and the transmitter are coupled by using a bus system, where the memory is configured to store an instruction, the receiver and the transmitter are used by the radio access network device to exchange information with a terminal device, and the processor is configured to execute the instruction stored in the memory.

The transmitter is configured to send access control information to the terminal device, where the access control information includes a plurality of check items arranged in a predetermined order, and each of the plurality of check items includes target object information and result processing information, where the plurality of check items are used by the terminal device to check the plurality of check items in the predetermined order when the terminal device needs to initiate access or a service, the target object information is used by the terminal device to check whether the terminal device belongs to a target object indicated by the target object information, and the result processing information is used to indicate that successful check is used as a final result or unsuccessful check is used as a final result; and if the terminal device belongs to a target object indicated by target object information included in a current check item, a check result of the current check item and result processing information of the current check item are used by the terminal to determine the check result of the current check item as the final result or check a next check item obtained in the predetermined order from the plurality of check items.

According to a seventh aspect, an embodiment of this application provides a system-on-a-chip. The system-on-a-chip may be applied to a terminal device, the system-on-a-chip includes at least one processor, at least one memory, and at least one communications interface, the processor, the memory, and the communications interface are interconnected by using a bus, and the processor executes an instruction stored in the memory, to enable the terminal device to perform the method according to any one of the first aspect or possible implementations of the first aspect.

According to an eighth aspect, an embodiment of this application provides a system-on-a-chip. The system-on-a-chip may be applied to a radio access network device, the system-on-a-chip includes at least one processor, at least one memory, and at least one communications interface, the processor, the memory, and the communications interface are interconnected by using a bus, and the processor executes an instruction stored in the memory, to enable the radio access network device to perform the method according to any one of the second aspect or possible implementations of the second aspect.

According to a ninth aspect, an embodiment of this application provides a computer-readable medium, configured to store a computer program. The computer program includes instructions used to perform the method according to any one of the first aspect or possible implementations of the first aspect and the method according to any one of the second aspect or possible implementations of the second aspect.

DETAILED DESCRIPTION

The following describes technical solutions of this application with reference to accompanying drawings.

The technical solutions of the embodiments of this application may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), a Worldwide Interoperability for Microwave Access (WiMAX) communications system, a future 5th generation (5G) system, or a new radio (NR) system.

A terminal device in the embodiments of this application may be referred to as user equipment, an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device further may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved public land mobile network (PLMN). This is not limited in the embodiments of this application.

The embodiments are described with reference to a radio access network device in this application. The radio access network device may be a device configured to communicate with the terminal device. For example, the radio access network device may be a combination of a base transceiver station (BTS) and a base station controller (BSC) in a GSM system or CDMA, may be a NodeB (NB) and a radio network controller (RNC) in a WCDMA system, or may be an evolved NodeB (eNB or eNodeB) in an LTE system, or the network device may be a relay station, an access point, an in-vehicle device, a wearable device, and an access network device in a future 5G network, for example, a next-generation base station or an access network device in a future evolved PLMN network.

Figure 1:
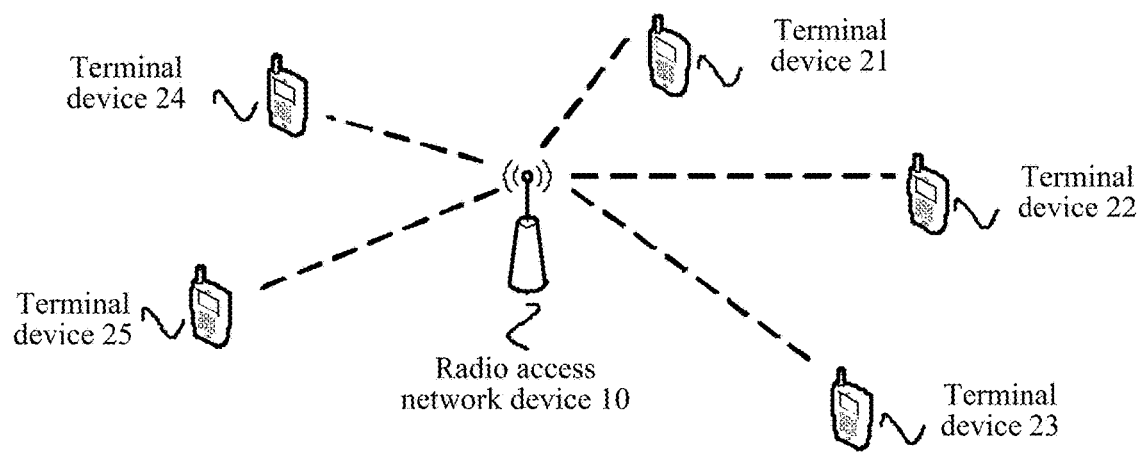
FIG. 1 is a schematic architectural diagram of an application scenario according to an embodiment of this application.

FIG. 1 is a schematic architectural diagram of an application scenario 100 according to an embodiment of this application. As shown in FIG. 1, the communications system may include a radio access network device 10 and a terminal device 21 to a terminal device 25, where the radio access network device 10 is configured to provide a communication service to the terminal device 21 to the terminal device 25, and access a core network. When network congestion occurs, the radio access network device 10 may perform access control on at least one of the terminal device 21 to the terminal device, for example, prohibit the terminal device 21 and the terminal device 23 from initiating access, thereby alleviating network congestion, to ensure experience of most users.

Figure 2:
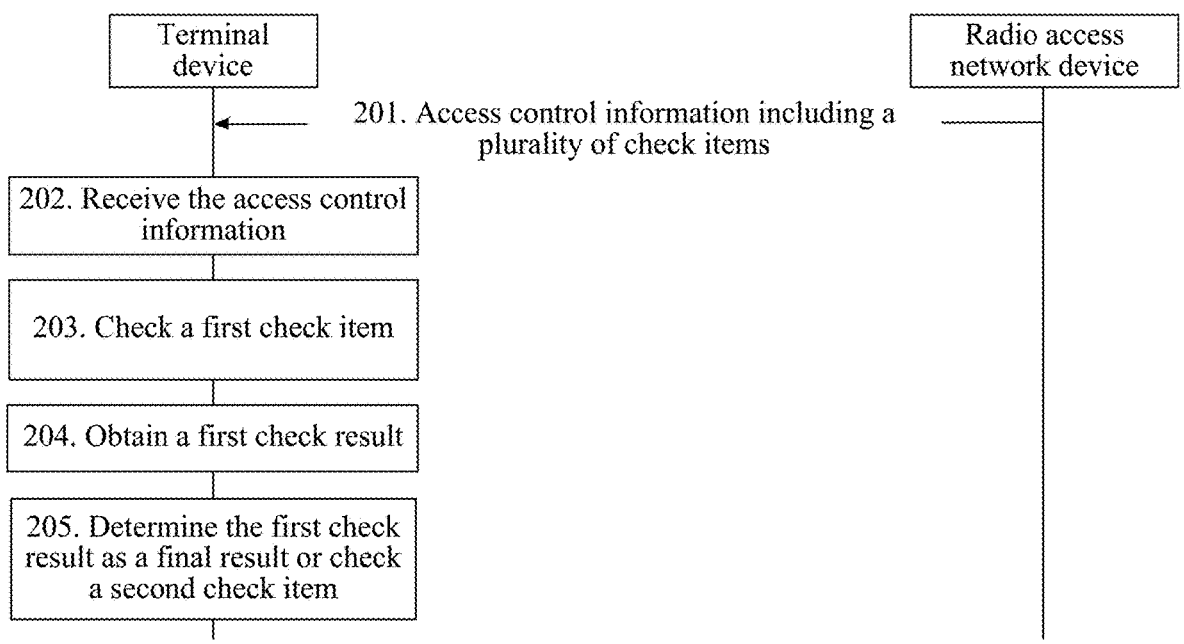
FIG. 2 is a schematic flowchart of an access control method according to an embodiment of this application.

FIG. 2 is a schematic flowchart of an access control method according to an embodiment of this application. The method may be applied to the scenario shown in FIG. 1, and certainly may also be applied to another communication scenario. This is not particularly limited in this embodiment of this application.

In 201, a radio access network device sends access control information to a terminal device, where the access control information includes a plurality of check items arranged in a predetermined order, and each of the plurality of check items includes target object information and result processing information, where the plurality of check items are used by the terminal device to check the plurality of check items in the predetermined order when the terminal device needs to initiate access or a service, the target object information is used by the terminal device to check whether the terminal device belongs to a target object indicated by the target object information, and the result processing information is used to indicate that successful check is used as a final result or unsuccessful check is used as a final result.

In this embodiment of this application, the access control information is used by the terminal device to sequentially check the plurality of check items in the preset order of the plurality of check items when the terminal device needs to initiate access or a service. The terminal device first checks whether the terminal device belongs to a target object indicated by target object information included in a current check item. If the terminal device is not the indicated target object, the terminal device checks a next check item in the preset order; or if the terminal device belongs to the indicated target object, the terminal device may obtain a check result of the current check item based on an action indicated by the check item, and determine, based on the check result and result indication information that is included in the current check item, whether to use the check result as the final result. If the check result can be used as the final result, when the final result is successful check, the terminal device may initiate access or a service to the radio access network device, or when the final result is unsuccessful check, the terminal device is prohibited from initiating access or a service to the radio access network device; or if the check result cannot be used as the final result, the terminal device checks the next check item.

Optionally, the target object information may include a target attribute and/or an applicable status.

In an implementation, when the target object information includes a target attribute, if an attribute of the terminal device matches the target attribute, the terminal device belongs to a target object indicated by the target attribute.

Optionally, the target attribute may belong to at least one of an access class of the terminal device, a type of a service initiated by the terminal device, a type of the terminal device, and application identifier information.

For example, if a target attribute included in a check item is access classes 3 to 6, a terminal device whose access class is 5 belongs to a target object indicated by the target attribute.

For another example, if a target attribute included in a check item is initiating a multimedia telephony (MMTel) voice service, a terminal device initiating an MMTel voice service belongs to a target object indicated by the target attribute.

For another example, if a target attribute included in a check item is a terminal device providing a voice service by using a circuit switched fallback (CSFB) solution, a terminal device providing a voice service by using the CSFB solution belongs to a target object indicated by the target attribute.

For another example, if a target attribute included in a check item is an application program whose identifier is 3, a terminal device executing the application program whose identifier is 3 belongs to a target object indicated by the target attribute.

For another example, if a target attribute included in a check item is access classes 6 to 9 and initiating an MMTel video service, a terminal device whose access class is 8 and initiating an MMTel video service belongs to a target object indicated by the target attribute.

It should be understood that, in addition to the foregoing listed information, the target attribute may further belong to other information such as whether a user is roaming, whether a terminal device is at a fixed location. This is not limited in this embodiment of this application. The target attribute may also support future extension, so as to satisfy a future requirement without a need of introducing a new access control mechanism.

It should be noted that, the plurality of check items are sequential. For each check item, the radio access network device may set a target attribute of the check item based on a need. For example, a target attribute of a first check item is a type of a terminal device, and a target attribute of a second check item is application identifier information; or a target attribute of a first check item is application identifier information, and a target attribute of a second check item is a type of a terminal device. All of these may be flexibly configured, thereby achieving different access control effects, to implement a powerful access control function.

In another implementation, when the target object information includes an applicable status, if a current status of the terminal device matches the applicable status, the terminal device belongs to a target object indicated by the applicable status.

Optionally, the applicable status includes a connected state and/or an idle state.

For example, if an applicable status of a check item is the connected state, a terminal device in the connected state belongs to a target object indicated by the applicable status.

For another example, if an applicable status of a check item is the idle state, a terminal device in the idle state belongs to a target object indicated by the applicable status.

For another example, if an applicable status of a check item is the connected state and the idle state, regardless of whether a current status of a terminal device is any status, that is, the connected state or the idle state, the terminal device belongs to a target object indicated by the applicable status.

Optionally, the applicable status may be indicated by using a bit.

For example, the connected state may be indicated by using "01", the idle state may be indicated by using "00", and any status may be indicated by using "11".

It should be understood that, in this embodiment of this application, in addition to the connected state and/or the idle state, the applicable status may further include another status. For example, the applicable status may further be a status defined in a future standard or protocol. This is not limited in this embodiment of this application.

In another implementation, when the target object information includes a target attribute and an applicable status, if an attribute of a terminal device matches the target attribute and a current status of the terminal device matches the applicable status, the terminal device belongs to the target object indicated by the target object information.

For example, if a target attribute included in a check item is access classes 4 to 8, and an applicable status of the check item is the connected state, a terminal device whose access class is 5 and that is in the connected state belongs to a target object indicated by the target object information.

Optionally, the check item may further include prohibition duration, and the prohibition duration is used to indicate duration of prohibiting initiating access or a service to the radio access network device. When the terminal device determines that the check result of the current check item may be used as the final result, and the final result is unsuccessful check, the terminal device is prohibited, in the prohibition duration included in the current check item, from initiating access or a service to the radio access network device.

Optionally, the check items may have different or same prohibition duration.

Optionally, when the check item does not include prohibition duration, the terminal device may use default prohibition duration.

Optionally, the check item is used to indicate an action that needs to be performed when the terminal device is configured to obtain a first check result. In this case, the terminal device may perform the action that needs to be performed, and obtain the first check result.

Optionally, the check item may further include probability information, and the probability information is used to indicate a probability that the terminal device can perform successful check on the check item or is used to indicate a probability that the terminal device cannot perform successful check on the check item. The check item is used to indicate an action of generating, by the terminal device, a random number in a first value range, and an action of determining the first check result based on the random number and the probability information.

In this case, when checking the current check item, the terminal device may generate the random number in the first value range based on the action, of generating the random number, indicated by the current check item, and determine a check result based on the random number and first probability information.

Optionally, when the check item does not include probability information, the terminal device may use default probability information. The check item is used to indicate an action of generating, by the terminal device, the random number in the first value range, and an action of determining the first check result based on the random number and the default probability information.

Figures 3, 4:
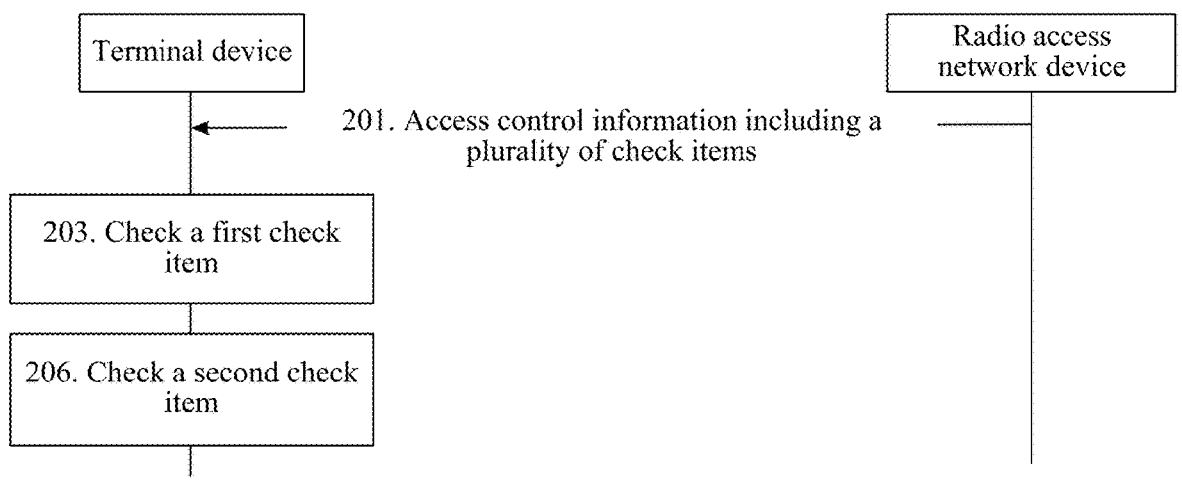
FIG. 3 shows access control information in a list form.
FIG. 4 is a schematic flowchart of an access control method according to an embodiment of this application.

Optionally, in this embodiment of this application, the access control information may be of a list form shown in FIG. 3. The access control information includes n check items, each check item includes a target attribute, an applicable status, and result processing information, may further include prohibition duration and probability information, and may further include other information.

Optionally, the access control information may be sent to the terminal device in an array form. As shown in FIG. 3, each check item is one element in an array, and the n check items can form one array including n elements.

Optionally, an order in the access control information and specific content of each piece of information in each check item may be configured based on a requirement of an operator.

For example, if all terminal devices whose access classes are 11 to 15 need to be capable of initiating access or a service, a target attribute of a first check item of a plurality of check items may be set to the access classes 11 to 15, and probability information is 100%, namely, a check result is successful check, and result processing information is set to indicate that successful check is used as a final result. In this case, successful check is used as the final result, all of the terminal devices whose access classes are 11 to 15 directly initiate access or a service.

For another example, when network load is relatively high, prohibition duration in which a terminal needs to be prohibited from initiating a video service occupying relatively large traffic may be set to be relatively long, and prohibition duration in which a terminal needs to be prohibited from initiating an SMS message service occupying relatively small traffic may be set to be relatively short.

For another example, a probability that a terminal device having a high access class can perform successful check can be set to a relatively large probability value. For example, probability information of a check item of a terminal device corresponding to access classes 13 to 15 is 95%. A probability that a terminal device having a low access class can perform successful check can be set to a relatively small probability value. For example, probability information of a check item of a terminal device corresponding to access classes 3 to 7 is 20%.

In this embodiment of this application, when the arrangement order of the plurality of check items differs, the final result is affected.

For example, two check items are a check item 1 and a check item 2 respectively, where a target attribute of the check item 1 is access classes 0 to 5, probability information is 100%, and result processing information is used to indicate that successful check is used as a final result; and a target attribute of the check item 2 is a voice service, a probability is 50%, and result processing information is used to indicate that unsuccessful check is used as a final result. In this case, a terminal device has an access class 3 and initiates a voice service. When the check item 1 is first checked, a final result is successful check, the check item 2 is not checked, and the terminal device may initiate a service to the radio access network device. When the check item 2 is first checked, if a check result is unsuccessful check, a final result is unsuccessful check, the check item 1 is not checked, and the terminal device is prohibited from initiating a service to the radio access network device.

It should be understood that, in this embodiment of this application, descriptions are made by using only the internal arrangement order of the check items shown in FIG. 3, but this embodiment of this application is not limited thereto, and the internal arrangement order of the check items may be adjusted.

Optionally, the radio access network device sends the access control information to the terminal device by using a broadcast message.

Optionally, the radio access network device sends the access control information to the terminal device by using dedicated signaling.

Optionally, the radio access network device sends the access control information to the terminal device in the connected state by using dedicated information, so that the terminal device determines, based on the access control information, whether to initiate a service.

Optionally, before sending, to the terminal device, information indicating entering the idle state, the radio access network device sends the access control information to the terminal device, or the information indicating entering the idle state carries the access control information, so as to control the terminal device to be capable of determining, based on the access control information after entering the idle state, whether to initiate access.

Optionally, the radio access network device may further send indication information to the terminal device by using dedicated signaling, where the indication information is used to indicate whether the terminal device needs to determine, based on the received access control information, whether to initiate a service or initiate access.

Optionally, the dedicated signaling includes dedicated Radio Resource Control (RRC) signaling.

Optionally, for the access control information, when network load meets a preset condition, the access control information may be sent to the terminal device.

For example, the network load includes three situations, namely, "high load", "common load", and "low load". When the network load is the "high load", the radio access network device may send the access control information to the terminal device, so as to implement access control and service control on the terminal device, to avoid network congestion as much as possible.

Optionally, the radio access network device may store a plurality of pieces of configured access control information, and send different access control information to the terminal device in different situations.

For example, the radio access network device sends access control information 1 to the terminal device when the network load is relatively high, and sends access control information 2 to the terminal device when the network load is relatively low.

In 202, the terminal device receives the access control information sent by the radio access network device.

Optionally, after receiving the access control information sent by the radio access network device by using dedicated information, the terminal device updates the access control information previously received by using the broadcast message to the access control information received by using the dedicated signaling.

For example, it is assumed that when being in the idle state, the terminal device receives broadcast access control information sent by the radio access network device by using a broadcast message, and performs access control on the terminal device based on the broadcast access control information; and after entering the connected state, the terminal device further receives dedicated access control information for the terminal device sent by the radio access network device by using dedicated signaling. In this case, the terminal device may update the broadcast access control information by using the dedicated access control information, that is, cover the broadcast access control information by using the dedicated access control information, and perform service control on the terminal device based on the dedicated access control information.

Optionally, when continuously receiving access control information twice by using dedicated signaling, the terminal device may update, by using newly received access control information, access control information received last time.

Optionally, when continuously receiving access control information twice by using a broadcast message, the terminal device may update, by using newly received access control information, access control information received last time.

In 203, when the terminal device needs to initiate access or a service, the terminal device checks a first check item obtained in the predetermined order from the plurality of check items.

Optionally, the terminal device may check whether the terminal device belongs to a target object indicated by first target object information included in the first check item.

For example, if a target attribute included in the first check item is access classes 3 to 5, and an access class of the terminal device is 5, the terminal device can determine that the terminal device belongs to a terminal device indicated by the target attribute.

For another example, a target attribute included in the first check item is initiating a voice service, and the terminal device does not initiate a voice service, when checking the first check item, the terminal device can determine that the terminal device is not a terminal device indicated by the target attribute.

In 204, the terminal device obtains, when the terminal device belongs to a target object indicated by first target object information included in the first check item, a first check result based on the first check item, where the first check result is successful check or unsuccessful check.

Optionally, the first check item is used to indicate an action that the terminal device needs to perform, and the terminal device performs the action that needs to be performed, and obtains the first check result.

Optionally, when each check item includes probability information, the first check item includes first probability information, and the first check item is used to indicate an action of generating, by the terminal device, the random number in the first value range, and an action of determining the first check result based on the random number and the first probability information.

In this case, based on the actions indicated by the first check item, the terminal device first generates the random number in the first value range and then determines the first check result based on the first probability information and the randomly generated random number.

In an implementation, the first probability information is used to indicate a probability that the terminal device can perform successful check. The terminal device determines whether the random number randomly generated in the first value range belongs to a second value range in which successful check can be performed and that is indicated by the first probability information. If the random number belongs to the second value range, the first check result is successful check, or if the random number does not fall in the second value range, the first check result is unsuccessful check.

For example, the first probability information included in the first check item is 60%, to indicate that successful check can be performed at a probability of 60%. It is assumed that the terminal device generates a random number 45 within a range of 1 to 100, and the random number 45 falls within a range of 1 to 60 in which successful check can be performed and that is indicated by 60%. Therefore, the first check result is successful check. It is assumed that a random number generated by the terminal device is 78, and the random number 78 falls beyond the range of 1 to 60 in which successful check can be performed and that is indicated by 60%. Therefore, the first check result is unsuccessful check.

In another implementation, the first probability information is used to indicate a probability that the terminal device cannot perform successful check. The terminal device determines whether the random number randomly generated in the first value range belongs to a second value range in which the terminal device cannot perform successful check and that is indicated by the first probability information. If the random number belongs to the second value range, the first check result is unsuccessful check, or if the random number does not fall in the second value range, the first check result is successful check.

For example, the first probability information included in the first check item is 75%, to indicate that successful check cannot be performed at a probability of 75%. It is assumed that the terminal device generates a random number 60 within a range of 1 to 100, and the random number 60 falls within a range of 1 to 75 in which successful check cannot be performed and that is indicated by 75%. Therefore, the first check result is unsuccessful check. It is assumed that a random number generated by the terminal device is 88, and the random number 88 falls beyond the range of 1 to 75 in which successful check cannot be performed and that is indicated by 75%. Therefore, the first check result is successful check.

Optionally, whether the first probability information is used to indicate a probability of successful check or a probability of unsuccessful check may depend on first result processing information. For example, if the first result processing information is used to indicate that successful check is used as the final result, the first probability information is a probability of successful check; or if the first result processing information is used to indicate that unsuccessful check is used as the final result, the first probability information is a probability of unsuccessful check.

Optionally, the probability information may be default probability information of the terminal device. In this case, the first check item is used to indicate an action of generating, by the terminal device, the random number in the first value range, and an action of determining the first check result based on the random number and the default probability information.

Optionally, the check item may further directly include the first value range and the second value range.

For example, if the first check item includes a first value range of 1 to 200 and a second value range of 1 to 50, the terminal device generates a random number in 1 to 200. If the random number belongs to 1 to 50, the first check result is successful check; or if the random number does not range from 1 to 50, the first check result is unsuccessful check.

Optionally, in this embodiment of this application, as shown in FIG. 4, in 206, when the terminal device is not the target object indicated by the first target object information included in the first check item, the terminal device checks a second check item obtained in the predetermined order from the plurality of check items.

For example, when the terminal device checks the first check item, if the terminal device determines that the terminal device is not a terminal device indicated by a target attribute of the first check item, the terminal device may check the second check item. If the terminal device determines that the terminal device is not a terminal device indicated by a target attribute of the second check item, the terminal device may then check a third check item, and the rest may be deduced by analogy, until the terminal device finds such a check item that the terminal device belongs to a terminal device indicated by a target attribute of the check item, or until the terminal device determines that the terminal device is not a terminal device indicated by a target attribute of a last check item of the plurality of check items.

In 205, when the first check item is not a last check item of the plurality of check items, the terminal device determines the first check result as the final result based on the first check result and first result processing information of the first check item, or checks a second check item obtained in the predetermined order from the plurality of check items.

Figure 5:
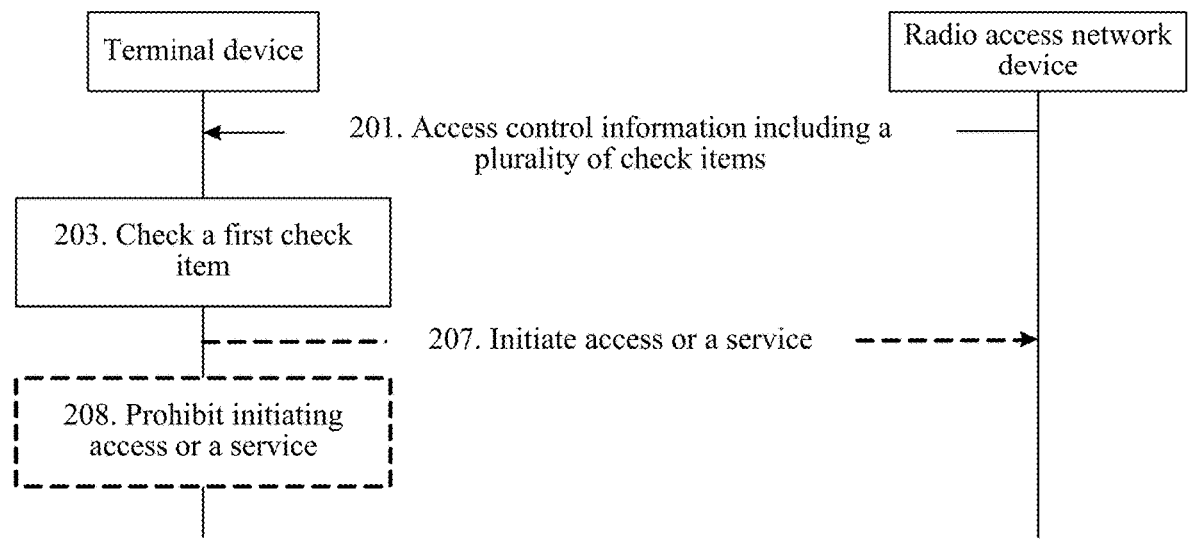
FIG. 5 is a schematic flowchart of an access control method according to an embodiment of this application.

Optionally, as shown in FIG. 5, in 207, when the first result processing information is used to indicate that successful check is used as the final result, and the first check result is successful check, the terminal device determines the first check result as the final result. In this case, the terminal device initiates access or a service to the radio access network device.

For example, as shown in Table 1, a row in Table 1 represents a check item, columns in Table 1 sequentially indicate target object information, probability information, prohibition duration, an applicable status, and result processing information, where each probability indicates a probability of successful check. When a terminal device whose access class is 3 and that is in an idle state checks a first check item, the terminal device belongs to a terminal device whose access class is 1 to 4, a current status is the idle state, and a randomly generated value is 50. Therefore, a check result is successful check. Because the result processing information is used to indicate that successful check is used as a final result, the final result is successful check. In this case, the terminal device may initiate access to the access network.

Optionally, as shown in FIG. 5, in 208, when the first result processing information is used to indicate that unsuccessful check is used as the final result, and the first check result is unsuccessful check, the terminal device determines the first check result as the final result. In this case, the terminal device is prohibited from initiating access or a service to the radio access network device.

For example, as shown in Table 1, a terminal device that initiates a video service and whose access class is 5 is not a terminal device whose access class is 1 to 4 and that is required by the first check item, and therefore the second check item is checked. The terminal device belongs to a terminal device initiating a video service, a current status is a connected state, and a randomly generated value is 70, and therefore a check result is unsuccessful check. Because the result processing information is used to indicate that unsuccessful check is used as a final result, the final result is unsuccessful check. In this case, the terminal device is prohibited from initiating a service to the access network.

TABLE 1

| Access class 1 to 4 | 60% | 5 minutes | Idle state | Successful check |
|---|---|---|---|---|
| Video service | 40% | 10 minutes | Connected state | Unsuccessful check |
| Access class 11 to 14 | 80% | 3 minutes | Connected state and idle state | Successful check |
| Application whose identifier is 3 | 20% | 15 minutes | Connected state | Unsuccessful check |
| CSFB | 70% | 9 minutes | Connected state | Unsuccessful check |

Optionally, when each check item includes prohibition duration, the first check item includes first prohibition duration. When the terminal device determines the first check result as the final result, and the final result is unsuccessful check, the terminal device is prohibited, within time indicated by the first prohibition duration, from initiating access or a service to the radio access network device.

Specifically, the terminal device sets duration of a timer to the first prohibition duration, and starts the timer; and before the timer times out, the terminal device is prohibited from initiating access or a service.

For example, when checking the second check item in Table 1, the terminal device determines the final result as unsuccessful check, and the terminal device sets duration of the timer to 10 minutes, and starts the timer; and within 10 minutes, the terminal device is prohibited from initiating a service.

Optionally, when the first result processing information is used to indicate that successful check is used as the final result, and the first check result is unsuccessful check, the terminal device checks the second check item.

For example, as shown in Table 1, when a terminal device whose access class is 12 checks a third check item, the terminal device belongs to access classes 11 to 14, and a randomly generated value is 91. Therefore, the check result is unsuccessful check. Because the result processing information is used to indicate that successful check is used as the final result, the terminal device checks a fourth check item in this case.

Optionally, when the first result processing information is used to indicate that unsuccessful check is used as the final result, and the first check result is successful check, the terminal device checks the second check item.

For example, as shown in Table 1, when a terminal device executing an application whose identifier is 3 checks the fourth check item, the terminal device belongs to a terminal device executing an application whose identifier is 3, and a randomly generated value is 15. Therefore, the check result is successful check. Because the result processing information is used to indicate that unsuccessful check is used as the final result, the terminal device checks a fifth check item in this case.

Optionally, in this embodiment of this application, the first check item may be the last check item of the plurality of check items.

In an implementation, when the first check item may be the last check item of the plurality of check items, the terminal device belongs to a target object indicated by first target information included in the first check item, and the first check result is successful check, the first result processing information in the first check item may be ignored, and successful check is directly used as the final result. In this case, the terminal device initiates access or a service to the radio access network device.

For example, as shown in Table 1, the terminal device checks the last check item. When the terminal device belongs to a terminal device providing a voice service by using CSFB, a randomly generated value is 65. Therefore, the check result is successful check, and the terminal device ignores the result processing information, and directly initiates a service to the radio access network device.

In another implementation, when the first check item is the last check item of the plurality of check items, the terminal device belongs to a target object indicated by first target information included in the first check item, and the first check result is unsuccessful check, the first result processing information in the first check item may be ignored, unsuccessful check is directly used as the final result, and the terminal device is prohibited from initiating access or a service to the radio access network device.

For example, as shown in Table 1, the terminal device checks the last check item. When the terminal device belongs to a terminal device providing a voice service by using CSFB, a randomly generated value is 88. Therefore, the check result is unsuccessful check. In this case, the terminal device starts a timer whose duration is 9 minutes, and is prohibited, within the 9 minutes, from initiating a service to the radio access network device.

In another implementation, when the first check item is the last check item of the plurality of check items, and the terminal device is not the target object indicated by the first target object information, the terminal device may directly initiate access or a service to the radio access network device.

For example, as shown in Table 1, when the terminal device checks the last check item. When the terminal device is not a terminal device providing a voice service by using CSFB, the terminal device may directly initiate a service to the radio access network device.

In another implementation, when the first check item is the last check item of the plurality of check items, and the terminal device is not the target object indicated by the first target object information, the terminal device may be prohibited from initiating access or a service to the radio access network device.

For example, as shown in Table 1, the terminal device checks the last check item. When the terminal device is not a terminal device providing a voice service by using CSFB, the terminal device is prohibited from initiating a service to the radio access network device.

In another implementation, when the first check item is the last check item of the plurality of check items, and the terminal device is not the target object indicated by the first target object information, the terminal device may determine the final result based on a check result of a previous check item of the first check item.

Optionally, when the check result of the previous check item is successful check, the terminal device may use successful check as the final result. In this case, the terminal device initiates access or a service to the radio access network device.

For example, as shown in Table 1, the terminal device checks the last check item. When the terminal device is not a terminal device providing a voice service by using CSFB, the check result obtained for the fourth check item is successful check. Therefore, the terminal device uses successful check as the final result, and initiates access or a service to the radio access network device.

Optionally, when the check result of the previous check item is unsuccessful check, the terminal device may use unsuccessful check as the final result. In this case, the terminal device is prohibited from initiating access or a service to the radio access network device.

For example, as shown in Table 1, the terminal device checks the last check item. When the terminal device is not a terminal device providing a voice service by using CSFB, the check result obtained for the fourth check item is unsuccessful check. In this case, the terminal device uses unsuccessful check as the final result, and is prohibited from initiating access or a service to the radio access network device.

Optionally, when the terminal device does not belong to target objects indicated by target object information included in all check items before the first check item as the last check item, the terminal device may use successful check as the final result. In this case, the terminal device may initiate access or a service to the radio access network device.

For example, as shown in Table 1, if the terminal device does not belong to the terminal devices indicated by the target attributes included in the first four check items, the terminal device checks the last check item. When the terminal device is not a terminal device providing a voice service by using CSFB, the terminal device may use successful check as the final result. In this case, the terminal device may initiate access or a service to the radio access network device.

Optionally, when the terminal device does not belong to target objects indicated by target object information included in all check items before the first check item as the last check item, the terminal device may further use unsuccessful check as the final result. In this case, the terminal device is prohibited from initiating access or a service to the radio access network device.

For example, as shown in Table 1, if the terminal device does not belong to the terminal devices indicated by the target attributes included in the first four check items, the terminal device checks the last check item. When the terminal device is not a terminal device providing a voice service by using CSFB, the terminal device may use unsuccessful check as the final result. In this case, the terminal device is prohibited from initiating access or a service to the radio access network device.

Optionally, the terminal device may first check the plurality of check items in the access control information in the preset order, to obtain a final result, and store the final result. When the terminal device needs to initiate access or a service to the radio access network device, the terminal device may determine, based on the final result, whether to initiate access or a service to the radio access network device.

Optionally, in this embodiment of this application, the terminal device may receive first access control information and second access control information that are sent by the radio access network device, where the first access control information is specific to a higher layer of the terminal device, and the second access control information is specific to an access layer of the terminal device.

Specifically, the higher layer of the terminal device may first check a plurality of check items in the first access control information, to obtain a first final result. When the first final result is unsuccessful check, the terminal device may be directly prohibited from initiating access or a service to the access network; or when the first final result is successful check, the terminal device may determine whether to check a plurality of check items in the second access control information at the access layer. When determining that the plurality of check items in the second access control information do not need to be checked, the terminal device may directly initiate access or a service to the access network; or when determining that the plurality of check items in the second access control information need to be checked, the terminal device may obtain a second final result. When the second final result is successful check, the terminal device may initiate access or a service to the access network; or when the second final result is unsuccessful check, the terminal device may be prohibited from initiating access or a service to the access network.

Optionally, the first access control information and the second access control information may be sent separately or may be sent together.

In this embodiment of this application, the order of the plurality of check items in the access control information may be flexibly configured. For example, a voice service is first checked, and then a terminal device whose access class is 3 is checked. Moreover, when a check result is successful check and result processing information indicates that successful check is a final result, access or a service may be directly initiated to the radio access network device, and a next check item does not need to be determined.

Therefore, in this embodiment of this application, the radio access network device sends the access control information to the terminal device, so that the terminal device performs access control based on the access control information, where each of the plurality of check items includes a piece of result processing information. Therefore, when sequentially checking the plurality of check items, the terminal device can directly use successful check as a final result in a particular situation, and initiate access or a service to the radio access network device, and does not need to determine a next check item. Therefore, a control process is more flexible, and check time is reduced, to implement a more powerful access control function.

Additionally, an operator can configure the order and content of the plurality of check items based on a requirement of the operator, thereby flexibly performing access control on the terminal device; and the plurality of check items have a same structure, and when a new check item or a target attribute needs to be added, setting may be performed based on the same structure, thereby having a relatively good extensibility.

The access control methods according to the embodiments of this application are described in detail above with reference to FIG. 2 to FIG. 5, and a terminal device and a radio access network device according to the embodiments of this application are described in detail below with reference to FIG. 6 to FIG. 11.

Figure 6:
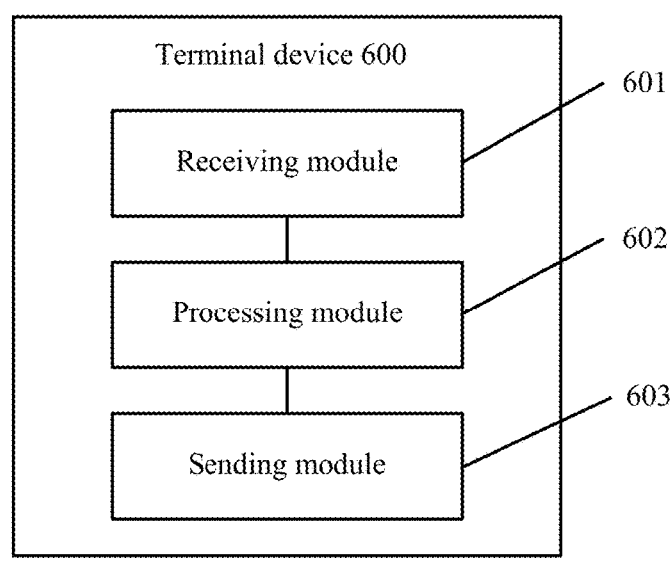
FIG. 6 is a schematic block diagram of a terminal device according to an embodiment of this application.

FIG. 6 is a schematic block diagram of a terminal device 600 according to an embodiment of this application. As shown in FIG. 6, the terminal device 600 includes:

a receiving module 601, configured to receive access control information sent by a radio access network device, where the access control information includes a plurality of check items arranged in a predetermined order, each of the plurality of check items includes target object information and result processing information, and the result processing information is used to indicate that successful check is used as a final result or unsuccessful check is used as a final result; and a processing module 602, configured to: when the terminal device 600 needs to initiate access or a service, check a first check item obtained in the predetermined order from the plurality of check items, where the processing module 602 is configured to obtain, when the terminal device 600 belongs to a target object indicated by first target object information included in the first check item, a first check result based on the first check item, where the first check result is successful check or unsuccessful check; and the processing module 602 is configured to: when the first check item is not a last check item of the plurality of check items, determine the first check result as the final result based on the first check result and first result processing information of the first check item, or check a second check item obtained in the predetermined order from the plurality of check items.

Therefore, in this embodiment of this application, the terminal device receives the access control information sent by the radio access network device to the terminal device, and performs access control based on the access control information, where each of the plurality of check items includes a piece of result processing information. Therefore, when sequentially checking the plurality of check items, the terminal device can directly use successful check as a final result in a particular situation, and initiate access or a service to the radio access network device, and does not need to determine a next check item. Therefore, a control process is more flexible, and check time is reduced.

Optionally, the processing module 602 is specifically configured to: when the first result processing information is used to indicate that successful check is used as the final result, and the first check result is successful check, determine the first check result as the final result; and the terminal device 600 further includes: a sending module 603, configured to initiate access or a service to the radio access network device.

Optionally, the processing module 602 is specifically configured to: when the first result processing information is used to indicate that unsuccessful check is used as the final result, and the first check result is unsuccessful check, determine the first check result as the final result; and the processing module 602 is further configured to prohibit initiating access or a service to the radio access network device.

Optionally, the check item includes prohibition duration; and the processing module 602 is configured to start a timer, where duration of the timer is first prohibition duration included in the first check item; and prohibit, before the timer times out, initiating access or a service.

Optionally, the processing module 602 is configured to check the second check item when the first result processing information is used to indicate that successful check is used as the final result, and the first check result is unsuccessful check.

Optionally, the processing module 602 is configured to check the second check item when the first result processing information is used to indicate that unsuccessful check is used as the final result, and the first check result is successful check.

Optionally, the processing module 602 is further configured to: when the terminal device 600 is not the target object indicated by the first target object information included in the first check item, check a second check item obtained in the predetermined order from the plurality of check items.

Optionally, when the first check item is the last check item of the plurality of check items, the sending module 603 is configured to: when the terminal device is not the target object indicated by the first target object information included in the first check item, initiate, by the terminal device, access or a service to the radio access network device.

Optionally, when the first check item is the last check item of the plurality of check items, the sending module 603 is configured to initiate access or a service to the radio access network device when the first check result is successful check.

Optionally, when the first check item is the last check item of the plurality of check items, the processing module 602 is configured to: when the first check result is unsuccessful check, prohibit initiating access or a service to the radio access network device.

Optionally, the check item includes probability information; and the processing module 602 is configured to determine the first check result based on first probability information included in the first check item and a random number randomly generated in a first value range.

Optionally, the target object information includes a target attribute and/or an applicable status; and the processing module 602 is configured to: when an attribute of the terminal device 600 matches a first target attribute included in the first check item, obtain the first check result based on the first check item; and/or when a current status of the terminal device 600 matches a first applicable status included in the first check item, obtain the first check result based on the first check item.

Optionally, the target attribute belongs to at least one of an access class of the terminal device, a type of a service initiated by the terminal device, a type of the terminal device, and application identifier information.

Optionally, the applicable status includes a connected state and/or an idle state.

Optionally, the receiving module 601 is configured to receive the access control information sent by the radio access network device by using a broadcast message; or receive the access control information sent by the radio access network device by using dedicated signaling.

Optionally, the processing module 602 is configured to update the access control information received by the receiver previously by using the broadcast message to the access control information received by the receiver by using the dedicated signaling.

Optionally, the dedicated signaling is dedicated RRC signaling.

It should be understood that, the terminal device 600 according to this embodiment of this application may correspond to a terminal device in the embodiments of this application, and the foregoing and other operations and/or functions of modules of the terminal device 600 are respectively used to implement corresponding processes of methods in FIG. 2, FIG. 4, and FIG. 5. For brevity, details are not described herein again.

Figure 7:
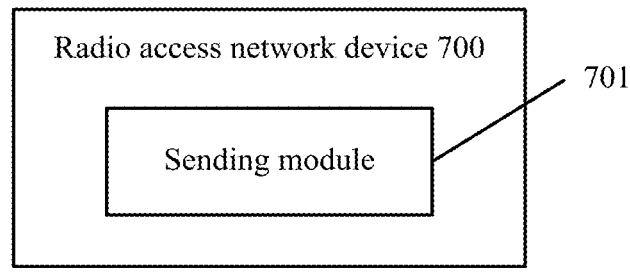
FIG. 7 is a schematic block diagram of a radio access network device according to an embodiment of this application.

FIG. 7 is a schematic block diagram of a radio access network device 700 according to an embodiment of this application. As shown in FIG. 7, the radio access network device 700 includes:

a sending module 701, configured to send access control information to a terminal device, where the access control information includes a plurality of check items arranged in a predetermined order, and each of the plurality of check items includes target object information and result processing information, where the plurality of check items are used by the terminal device to check the plurality of check items in the predetermined order when the terminal device needs to initiate access or a service, the target object information is used by the terminal device to check whether the terminal device belongs to a target object indicated by the target object information, and the result processing information is used to indicate that successful check is used as a final result or unsuccessful check is used as a final result; and if the terminal device belongs to a target object indicated by target object information included in a current check item, a check result of the current check item and result processing information of the current check item are used by the terminal to determine the check result of the current check item as the final result or check a next check item obtained in the predetermined order from the plurality of check items.

Therefore, in this embodiment of this application, the radio access network device sends the access control information to the terminal device, so that the terminal device performs access control based on the access control information, where each of the plurality of check items includes a piece of result processing information. Therefore, when sequentially checking the plurality of check items, the terminal device can directly use successful check as a final result in a particular situation, and initiate access or a service to the radio access network device, and does not need to determine a next check item. Therefore, a control process is more flexible, and check time is reduced.

Additionally, an operator can configure the order and content of the plurality of check items based on a requirement of the operator, thereby flexibly performing access control on the terminal device; and the plurality of check items have a same structure, and when a new check item needs to be added, setting may be performed based on the same structure, thereby having a relatively good extensibility.

Optionally, the sending module 701 is configured to send the access control information to the terminal device by using a broadcast message; or send the access control information to the terminal device by using dedicated signaling.

Optionally, the dedicated signaling is dedicated Radio Resource Control RRC signaling.

Optionally, the check item includes prohibition duration, and if the terminal determines the check result of the current check item as the final result and the final result is unsuccessful check, prohibition duration of the current check item is used to indicate duration in which the terminal device is prohibited from initiating access or a service to the radio access network device.

Optionally, the check item includes probability information, and the probability information is used by the terminal device to determine a check result.

Optionally, the target object information includes a target attribute and/or an applicable status, and if an attribute of the terminal device matches the target attribute and/or a current status of the terminal device matches the applicable status, the terminal device belongs to the target object indicated by the target object information.

Optionally, the target attribute belongs to at least one of an access class of the terminal device, a type of a service initiated by the terminal device, a type of the terminal device, and application identifier information.

Optionally, the applicable status includes a connected state and/or an idle state.

It should be understood that, the radio access network device 700 according to this embodiment of this application may correspond to a radio access network device in the embodiments of this application, and the foregoing and other operations and/or functions of modules of the radio access network device 700 are respectively used to implement corresponding processes of methods in FIG. 2, FIG. 4, and FIG. 5. For brevity, details are not described herein again.

Figure 8:
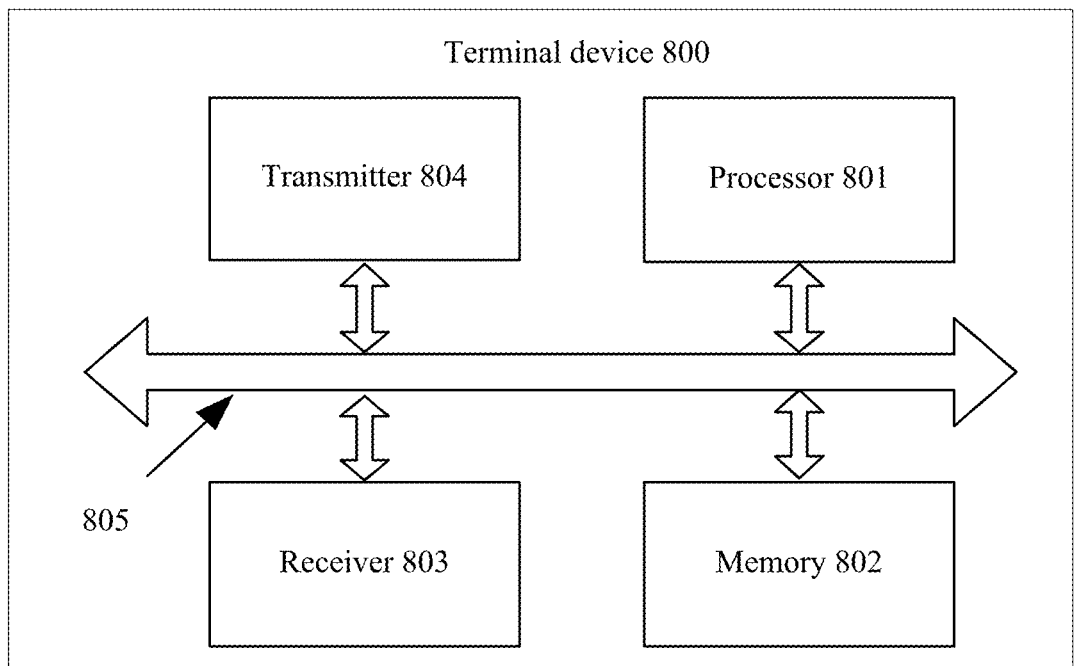
FIG. 8 is a schematic structural diagram of a terminal device according to an embodiment of this application.

FIG. 8 is a schematic structural diagram of a terminal device 800 according to an embodiment of this application. As shown in FIG. 8, the terminal device 800 includes a processor 801, a memory 802, a receiver 803, a transmitter 804, and a bus system 805. The processor 801, the memory 802, the receiver 803, and the transmitter 804 may be coupled by using the bus system 805, the memory 802 is configured to store an instruction, the receiver 803 and the transmitter 804 are used by the terminal device 800 to exchange information with a radio access network device, and the processor 801 is configured to execute the instruction stored in the memory 802.

The receiver 803 is configured to receive access control information sent by the radio access network device, where the access control information includes a plurality of check items arranged in a predetermined order, each of the plurality of check items includes target object information and result processing information, and the result processing information is used to indicate that successful check is used as a final result or unsuccessful check is used as a final result;

the processor 801 is configured to: when the terminal device 800 needs to initiate access or a service, check a first check item obtained in the predetermined order from the plurality of check items;

the processor 801 is configured to obtain, when the terminal device 800 belongs to a target object indicated by first target object information included in the first check item, a first check result based on the first check item, where the first check result is successful check or unsuccessful check; and the processor 801 is configured to: when the first check item is not a last check item of the plurality of check items, determine the first check result as the final result based on the first check result and first result processing information of the first check item, or check a second check item obtained in the predetermined order from the plurality of check items.

It should be understood that, the terminal device 800 according to this embodiment of this application may correspond to a terminal device in the embodiments of this application, and the foregoing and other operations and/or functions of modules of the terminal device 800 are respectively used to implement corresponding processes of methods in FIG. 2, FIG. 4, and FIG. 5. For brevity, details are not described herein again.

Figure 9:
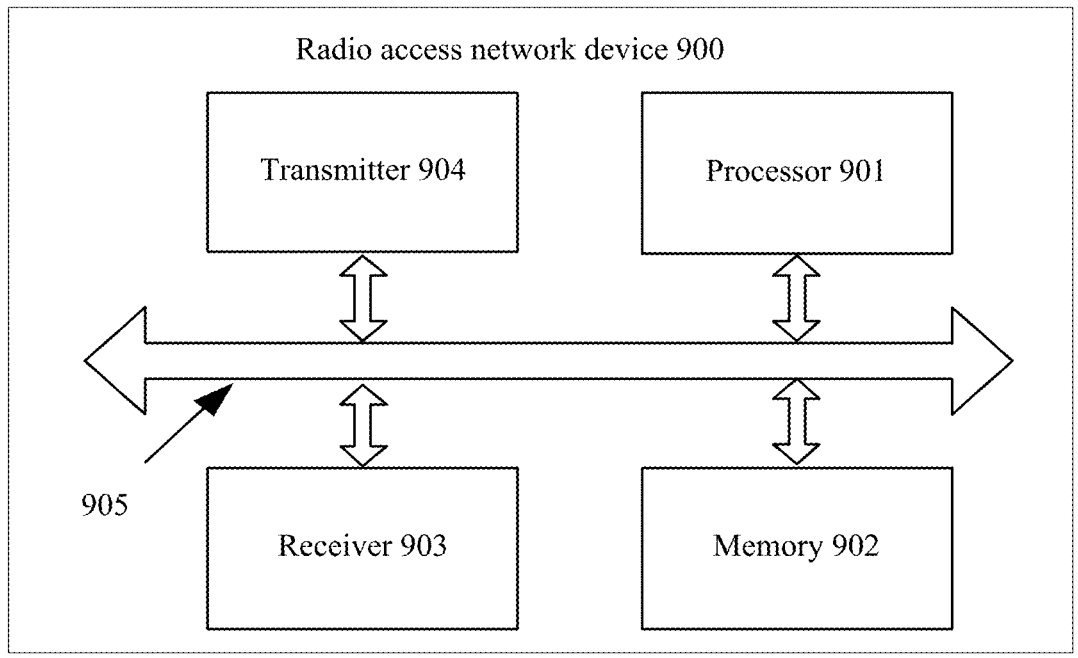
FIG. 9 is a schematic structural diagram of a radio access network device according to an embodiment of this application.

FIG. 9 is a schematic structural diagram of a radio access network device 900 according to an embodiment of this application. As shown in FIG. 9, the radio access network device 900 includes a processor 901, a memory 902, a receiver 903, a transmitter 904, and a bus system 905. The processor 901, the memory 902, the receiver 903, and the transmitter 904 may be coupled by using the bus system 905, the receiver 903 and the transmitter 904 are used by the radio access network device 900 to exchange information with a terminal device, and the processor 901 is configured to execute an instruction stored in the memory 902.

The transmitter 904 is configured to send access control information to the terminal device, where the access control information includes a plurality of check items arranged in a predetermined order, and each of the plurality of check items includes target object information and result processing information, where the plurality of check items are used by the terminal device to check the plurality of check items in the predetermined order when the terminal device needs to initiate access or a service, the target object information is used by the terminal device to check whether the terminal device belongs to a target object indicated by the target object information, and the result processing information is used to indicate that successful check is used as a final result or unsuccessful check is used as a final result; and if the terminal device belongs to a target object indicated by target object information included in a current check item, a check result of the current check item and result processing information of the current check item are used by the terminal to determine the check result of the current check item as the final result or check a next check item obtained in the predetermined order from the plurality of check items.

It should be understood that, the radio access network device 900 according to this embodiment of this application may correspond to a radio access network device in the embodiments of this application, and the foregoing and other operations and/or functions of modules of the radio access network device 900 are respectively used to implement corresponding processes of methods in FIG. 2, FIG. 4, and FIG. 5. For brevity, details are not described herein again.

Figure 10:
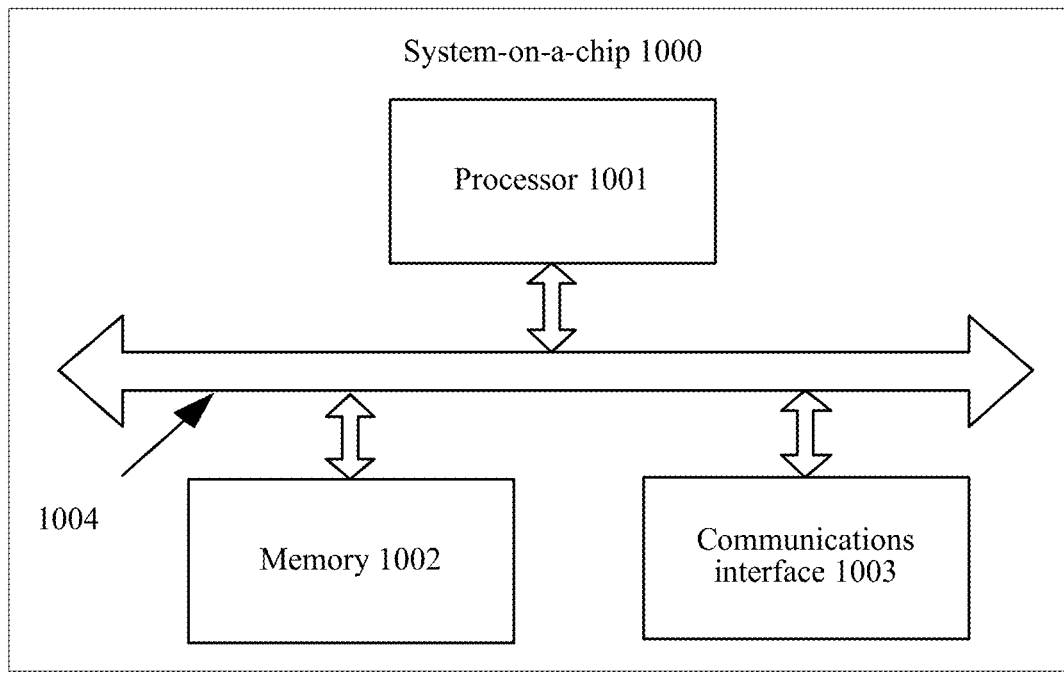
FIG. 10 is a schematic structural diagram of a system-on-a-chip according to an embodiment of this application.

FIG. 10 is a schematic structural diagram of a system-on-a-chip 1000 according to an embodiment of this application. The system-on-a-chip 1000 may be applied to a terminal device. As shown in FIG. 10, the system-on-a-chip 1000 includes at least one processor 1001, at least one memory 1002, and at least one communications interface 1003, the processor 1001, the memory 1002, and the communications interface 1003 are interconnected by using a bus 1004, and the processor 1001 executes an instruction stored in the memory 1002.

The communications interface 1003 is configured to receive access control information sent by a radio access network device, where the access control information includes a plurality of check items arranged in a predetermined order, each of the plurality of check items includes target object information and result processing information, and the result processing information is used to indicate that successful check is used as a final result or unsuccessful check is used as a final result;

the processor 1001 is configured to: when the terminal device needs to initiate access or a service, check a first check item obtained in the predetermined order from the plurality of check items;

the processor 1001 is configured to obtain, when the terminal device belongs to a target object indicated by first target object information included in the first check item, a first check result based on the first check item, where the first check result is successful check or unsuccessful check; and the processor 1001 is configured to: when the first check item is not a last check item of the plurality of check items, determine the first check result as the final result based on the first check result and first result processing information of the first check item, or check a second check item obtained in the predetermined order from the plurality of check items.

It should be understood that, although FIG. 10 shows one processor 1001, one memory 1002, and one communications interface 1003, this embodiment of this application is not limited thereto. The system-on-a-chip 1000 may include a plurality of processors, a plurality of memories, and a plurality of communications interfaces.

It should be further understood that, the system-on-a-chip 1000 according to this embodiment of this application may be applied to a terminal device in the embodiments of this application, and the foregoing and other operations and/or functions of modules of the system-on-a-chip 1000 are respectively used to implement corresponding processes of methods in FIG. 2, FIG. 4, and FIG. 5. For brevity, details are not described herein again.

Figure 11:
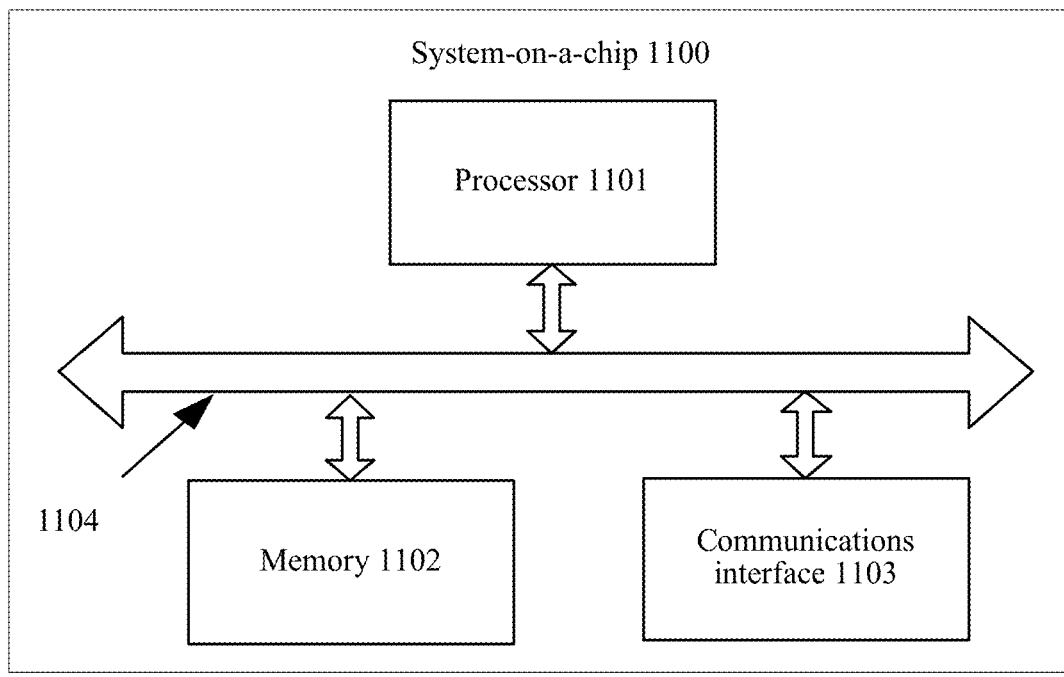
FIG. 11 is a schematic structural diagram of a system-on-a-chip according to an embodiment of this application.

FIG. 11 is a schematic structural diagram of a system-on-a-chip 1100 according to an embodiment of this application. The system-on-a-chip 1100 may be applied to a radio access network device. As shown in FIG. 11, the system-on-a-chip 1100 includes at least one processor 1101, at least one memory 1102, and at least one communications interface 1103, the processor 1101, the memory 1102, and the communications interface 1103 are interconnected by using a bus 1104, and the processor 1101 executes an instruction stored in the memory 1102.

The communications interface 1103 is configured to send access control information to a terminal device, where the access control information includes a plurality of check items arranged in a predetermined order, and each of the plurality of check items includes target object information and result processing information, where the plurality of check items are used by the terminal device to check the plurality of check items in the predetermined order when the terminal device needs to initiate access or a service, the target object information is used by the terminal device to check whether the terminal device belongs to a target object indicated by the target object information, and the result processing information is used to indicate that successful check is used as a final result or unsuccessful check is used as a final result; and if the terminal device belongs to a target object indicated by target object information included in a current check item, a check result of the current check item and result processing information of the current check item are used by the terminal to determine the check result of the current check item as the final result or check a next check item obtained in the predetermined order from the plurality of check items.

It should be understood that, although FIG. 11 shows one processor 1101, one memory 1102, and one communications interface 1103, this embodiment of this application is not limited thereto. The system-on-a-chip 1100 may include a plurality of processors, a plurality of memories, and a plurality of communications interfaces.

It should be further understood that, the system-on-a-chip 1100 according to this embodiment of this application may be applied to a radio access network device in the embodiments of this application, and the foregoing and other operations and/or functions of modules of the system-on-a-chip 1100 are respectively used to implement corresponding processes of methods in FIG. 2, FIG. 4, and FIG. 5. For brevity, details are not described herein again.

In this embodiment of this application, the processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache.

The communications interface may be a serial communications interface and/or a parallel communications interface. The serial communications interface may be a Recommended Standard (RS) 232 interface, an RS-422 interface, or an RS-485 interface. A mode of the parallel communications interface may be a standard parallel port (SPP), an enhanced parallel port (Enhanced Parallel Port, EPP), or an extended capabilities port (ECP).

The bus system may further include a power bus, a control bus, a status signal bus, and the like, in addition to a data bus. For ease of representation, only one thick line is used to represent the bus in the figure, but this does not mean that there is only one bus or only one type of bus.

An embodiment of this application provides a computer-readable medium, configured to store a computer program, and the computer program includes instructions used to perform access control methods according to embodiments of this application in FIG. 2, FIG. 4, and FIG. 5. The readable medium may be a ROM or a RAM. This is not limited in this embodiment of this application.

It should be understood that the term "and/or" and "at least one of A or B" in this specification are only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An access control method, comprising:
   receiving, by a terminal device, access control information sent by a radio access network device, wherein the access control information comprises a plurality of check items arranged in a predetermined order, each of the plurality of check items comprises target object information and result processing information, and the result processing information indicates that a successful check is used as a final result or an unsuccessful check is used as a final result;
   when the terminal device needs to initiate access or a service, checking, by the terminal device, a first check item obtained in the predetermined order from the plurality of check items;
   obtaining, by the terminal device when the terminal device belongs to a target object indicated by first target object information comprised in the first check item, a first check result based on the first check item, wherein the first check result is a successful check or an unsuccessful check; and
   when the first check item is not a last check item of the plurality of check items, determining, by the terminal device, the first check result as the final result based on the first check result and first result processing information of the first check item, or checking a second check item obtained in the predetermined order from the plurality of check items.

2. The method according to claim 1, wherein:
   determining, by the terminal device, the first check result as the final result based on the first check result and first result processing information of the first check item, or checking a second check item obtained in the predetermined order from the plurality of check items comprises:
   when the first result processing information indicates that a successful check is used as the final result, and the first check result is a successful check, determining, by the terminal device, the first check result as the final result; and
   the method further comprises:
   initiating, by the terminal device, access or a service to the radio access network device.

3. The method according to claim 1, wherein:
   determining, by the terminal device, the first check result as the final result based on the first check result and first result processing information of the first check item, or checking a second check item obtained in the predetermined order from the plurality of check items comprises:
   when the first result processing information indicates that an unsuccessful check is used as the final result, and the first check result is an unsuccessful check, determining, by the terminal device, the first check result as the final result; and the method further comprises:
prohibiting the terminal device from initiating access or a service to the radio access network device.

4. The method according to claim 3, wherein:
the first or second check item comprises prohibition duration; and
prohibiting the terminal device from initiating access or a service to the radio access network device comprises:
starting, by the terminal device, a timer, wherein duration of the timer is a first prohibition duration comprised in the first check item; and
before the timer times out, prohibiting the terminal device from initiating access or a service.

5. The method according to claim 1, wherein determining, by the terminal device, the first check result as the final result based on the first check result and first result processing information of the first check item, or checking a second check item obtained in the predetermined order from the plurality of check items comprises:
when the first result processing information indicates that a successful check is used as the final result, and the first check result is an unsuccessful check, checking, by the terminal device, the second check item; or
when the first result processing information indicates that an unsuccessful check is used as the final result, and the first check result is a successful check, checking, by the terminal device, the second check item.

6. The method according to claim 1, further comprising:
when the terminal device is not a target object indicated by the first target object information, checking, by the terminal device, the second check item.

7. The method according to claim 1, wherein when the first check item is the last check item of the plurality of check items, the method further comprises:
when the terminal device is not a target object indicated by the first target object information, initiating, by the terminal device, access or a service to the radio access network device;
when the first check result is a successful check, initiating, by the terminal device, access or a service to the radio access network device; or
when the first check result is an unsuccessful check, prohibiting the terminal device from initiating access or a service to the radio access network device.

8. The method according to claim 1, wherein:
the first or second check item comprises probability information; and
obtaining, by the terminal device when the terminal device belongs to a target object indicated by first target object information comprised in the first check item, a first check result based on the first check item comprises:
determining, by the terminal device, the first check result based on first probability information comprised in the first check item and a random number randomly generated in a first value range.

9. The method according to claim 1, wherein:
the target object information comprises a target attribute and/or an applicable status; and
obtaining, by the terminal device when the terminal device belongs to a target object indicated by first target object information comprised in the first check item, a first check result based on the first check item comprises:
when an attribute of the terminal device matches a first target attribute comprised in the first check item, obtaining, by the terminal device, the first check result based on the first check item, and/or
when a current status of the terminal device matches a first applicable status comprised in the first check item, obtaining, by the terminal device, the first check result based on the first check item.

10. The method according to claim 9, wherein the target attribute belongs to at least one of an access class of the terminal device, a type of a service initiated by the terminal device, a type of the terminal device, and application identifier information.

11. The method according to claim 1, wherein receiving, by a terminal device, access control information sent by a radio access network device comprises:
receiving, by the terminal device, the access control information sent by the radio access network device by using a broadcast message; or
receiving, by the terminal device, the access control information sent by the radio access network device by using dedicated signaling.

12. The method according to claim 11, wherein receiving, by the terminal device, the access control information sent by the radio access network device by using dedicated signaling comprises:
updating, by the terminal device, the access control information received previously by using the broadcast message to the access control information received by using the dedicated signaling.

13. An access control method, comprising:
sending, by a radio access network device, access control information to a terminal device, wherein the access control information comprises a plurality of check items arranged in a predetermined order, and each of the plurality of check items comprises target object information and result processing information, wherein:
the plurality of check items are used by the terminal device to check the plurality of check items in the predetermined order when the terminal device needs to initiate access or a service, the target object information is used by the terminal device to check whether the terminal device belongs to a target object indicated by the target object information, and the result processing information is used to indicate that a successful check is used as a final result or an unsuccessful check is used as a final result; and
when the terminal device belongs to a target object indicated by target object information comprised in a current check item, a check result of the current check item and result processing information of the current check item are used by the terminal to determine the check result of the current check item as the final result or to check a next check item obtained in the predetermined order from the plurality of check items.

14. The method according to claim 13, wherein sending, by a radio access network device, access control information to a terminal device comprises:
sending, by the radio access network device, the access control information to the terminal device by using a broadcast message; or
sending, by the radio access network device, the access control information to the terminal device by using dedicated signaling.

15. The method according to claim 14, wherein the dedicated signaling is dedicated Radio Resource Control (RRC) signaling.

16. The method according to claim 13, wherein:
the current or next check item comprises prohibition duration; and
when the terminal determines the check result of the current check item as the final result and the final result is an unsuccessful check, prohibition duration of the current check item is used to indicate duration in which the terminal device is prohibited from initiating access or a service to the radio access network device.

17. The method according to claim 13, wherein the check item comprises probability information, and the probability information is used by the terminal device to determine a check result.

18. The method according to claim 13, wherein:
the target object information comprises a target attribute and/or an applicable status; and
when an attribute of the terminal device matches the target attribute and/or a current status of the terminal device matches the applicable status, the terminal device belongs to the target object indicated by the target object information.

19. The method according to claim 18, wherein the target attribute belongs to at least one of an access class of the terminal device, a type of a service initiated by the terminal device, a type of the terminal device, and application identifier information.

20. A terminal device, comprising:
a processor, a memory, a receiver, and a transmitter coupled via a bus system; and
wherein the memory is configured to store one or more instructions which, when executed by the processor, cause the terminal device to:
receive access control information sent by a radio access network device, wherein the access control information comprises a plurality of check items arranged in a predetermined order, each of the plurality of check items comprises target object information and result processing information, and the result processing information indicates that a successful check is used as a final result or an unsuccessful check is used as a final result,
when the terminal device needs to initiate access or a service, check a first check item obtained in the predetermined order from the plurality of check items,
obtain, when the terminal device belongs to a target object indicated by first target object information comprised in the first check item, a first check result based on the first check item, wherein the first check result is a successful check or an unsuccessful check, and
when the first check item is not a last check item of the plurality of check items, determine the first check result as the final result based on the first check result and first result processing information of the first check item, or check a second check item obtained in the predetermined order from the plurality of check items.

* * * * *